(12) United States Patent
Neef et al.

(10) Patent No.: US 11,633,686 B2
(45) Date of Patent: *Apr. 25, 2023

(54) ROUND FILTER ELEMENT, IN PARTICULAR FOR GAS FILTRATION

(71) Applicant: MANN+HUMMEL GmbH, Ludwigsburg (DE)

(72) Inventors: Pascal Neef, Trossingen (DE); Nadine Donauer, Fellbach (DE); Philipp Hettkamp, Steinheim (DE); Torsten Fritzsching, Vaihingen (DE); Pedro Miguel Pereira Madeira, Bietigheim-Bissingen (DE)

(73) Assignee: MANN+HUMMEL GmbH

( * ) Notice: Subject to any disclaimer, the term of this patent is extended or adjusted under 35 U.S.C. 154(b) by 170 days.

This patent is subject to a terminal disclaimer.

(21) Appl. No.: 17/171,733

(22) Filed: Feb. 9, 2021

(65) Prior Publication Data
US 2021/0229017 A1 Jul. 29, 2021

Related U.S. Application Data

(63) Continuation of application No. 16/386,366, filed on Apr. 17, 2019, now Pat. No. 10,946,323, which is a (Continued)

(30) Foreign Application Priority Data

Oct. 17, 2016 (DE) ...................... 10 2016 012 331.1

(51) Int. Cl.
*B01D 46/24* (2006.01)
*B01D 46/00* (2022.01)
(Continued)

(52) U.S. Cl.
CPC ......... *B01D 46/2414* (2013.01); *B01D 27/08* (2013.01); *B01D 46/0005* (2013.01);
(Continued)

(58) Field of Classification Search
CPC ............ B01D 46/2411; B01D 46/2414; B01D 46/0005; B01D 46/521; B01D 2265/021;
(Continued)

(56) References Cited

U.S. PATENT DOCUMENTS 10,946,323 B2 * 3/2021 Neef .................. F02M 35/0245

FOREIGN PATENT DOCUMENTS

WO 2006084282 A2 8/2006

* cited by examiner

Primary Examiner — Robert Clemente

(57) ABSTRACT

A round filter element has a filter medium body with a wall to be flowed through by a fluid to be purified in a radial direction relative to a longitudinal axis of the filter medium body. A circumferentially extending seal carrier is arranged at or adjacent to an end face of the filter medium body. A sealing element is supported at the seal carrier adjacent to a radial outer side of the filter medium body. A positioning element extends into the filter medium body and engages with a correlated housing-associated counter positioning element of a filter housing when the round filter element is installed in the filter housing. The seal carrier separates flow-tightly a raw side of the round filter element from a clean side of the round filter element when the round filter element is installed in the filter housing.

13 Claims, 4 Drawing Sheets

Related U.S. Application Data continuation of application No. PCT/EP2017/076395, filed on Oct. 17, 2017.

(51) Int. Cl.
    *B01D 46/52*     (2006.01)
    *F02M 35/024*     (2006.01)
    *F02M 35/02*     (2006.01)
    *B01D 27/08*     (2006.01)

(52) U.S. Cl.
    CPC .............. *B01D 46/24* (2013.01); *B01D 46/52* (2013.01); *B01D 46/521* (2013.01); *F02M 35/0201* (2013.01); *F02M 35/0245* (2013.01); *F02M 35/02416* (2013.01); *F02M 35/02483* (2013.01); *B01D 2265/021* (2013.01); *B01D 2265/026* (2013.01); *B01D 2271/027* (2013.01); *B01D 2275/208* (2013.01); *B01D 2279/60* (2013.01)

(58) Field of Classification Search
    CPC ......... B01D 2275/208; F02M 35/0201; F02M 35/02416; F02M 35/0245; F02M 35/02483
    See application file for complete search history.

ROUND FILTER ELEMENT, IN PARTICULAR FOR GAS FILTRATION

CROSS-REFERENCE TO RELATED APPLICATIONS

This application is a continuation application of U.S. Ser. No. 16/386,366 having a US filing date of 17 Apr. 2019. U.S. Ser. No. 16/386,366 is a continuation application of international application No. PCT/EP2017/076395 having an international filing date of 17 Oct. 2017 and designating the United States, the international application claiming a priority date of 17 Oct. 2016 based on prior filed German patent application No. 10 2016 012 331.1, the entire contents of the aforesaid US application, the aforesaid international application and the aforesaid German patent application being incorporated herein by reference to the fullest extent permitted by the law.

BACKGROUND OF THE INVENTION

The invention concerns a round filter element, in particular for gas filtration, for example, for an air filter, with a filter medium body whose wall can be flowed through by the fluid to be purified relative to the longitudinal axis of the filter medium body in radial direction, with at least one end disk at an end face of the filter medium body.

US 2013/0, 232934 A1 discloses a round filter element that can be used in an air filter, for example, in the intake manifold of an internal combustion engine. The filter element is provided with a hollow cylindrical filter medium body having a support grid for supporting the filter medium body arranged at its outer side. The outwardly positioned wall surface of the filter medium body is provided with a V-shaped cut into which a rod-shaped positioning element is inserted which, in the installed state inside the receiving filter housing, prevents accidental rotation about the longitudinal axis of the filter element. The walls in the region of the V-shaped cut of the filter medium body are sealed flow-tightly. For sealing the raw side relative to the clean side of the filter element, a circumferentially extending sealing element is provided in the region of an end disk at an end face of the filter medium body.

SUMMARY OF THE INVENTION

It is the object of the invention to embody with simple constructive measures a round filter element in such a way that the round filter element is reliably received in the filter housing in the installed state.

This object is solved according to the invention in that at or adjacent to an end face of the filter medium body a circumferentially extending seal carrier is arranged on which a sealing element is supported adjacent to the outer side of the filter medium body and in that, at the round filter element, a positioning element extending into the filter medium body is arranged for form-fit connection of the round filter element with a correlated housing-associated counter positioning element in the installed state in the filter housing, wherein the seal carrier separates flow-tightly the raw side from the clean side.

The dependent claims provide expedient further embodiments.

The round filter element according to the invention is preferably used for gas filtration, for example, for filtration of air, in particular in the intake manifold of an internal combustion engine of a vehicle. The filter element comprises a filter medium body whose wall is flowed through by the fluid to be purified. The filter medium body surrounds an inwardly positioned flow space that is delimited by the inner wall of the filter medium body. Relative to its longitudinal axis, the filter medium body is flowed through in radial direction, preferably radially from the interior to the exterior, so that the inwardly positioned flow space adjoins the raw side of the filter medium body and the outer side of the filter medium body forms the clean side via which the purified fluid exits. At least at one axial end face, preferably at both oppositely positioned axial end faces, the filter medium body is covered flow-tightly by end disks.

In a preferred embodiment, an end disk comprises a central opening, communicating with the inwardly positioned flow space, for axial flow conveyance of the fluid; however, the oppositely positioned end disk is embodied to be closed and closes off the inwardly positioned flow space outwardly in axial direction.

Expediently, the end disk of the filter element that is provided with the central opening is rounded at its radial inner side whereby the inflow of the raw air into the interior in the filter medium body is facilitated. This is of particular importance in connection with the inflow into the interior of the filter element for minimizing the total pressure loss when, as preferred in the present case, the air flows freely into the interior and, as further preferred in the present case, no flow pipe is provided that guides the air flow directly into the interior. The radius of the rounded portion at the radial inner side of the end disk is advantageously larger than at the radial outer side. The radius at the radial inner side is embodied, as needed, so large that the starting point of the radius at the end face is still within the contour of the filter medium body. The radius of the rounded portion at the radial inner side of the end disk lies, for example, in a range between 5 mm and 15 mm, for example, is 7.5 mm.

The round filter element with the filter medium body can be embodied to be hollow cylindrical or not rotation-symmetric, for example, can have an oval or ovalized cross section shape, wherein also cross section shapes with parallel long sides and semicircular narrow sides are conceivable and the long sides can be curved slightly convexly or concavely externally or inwardly. In a preferred embodiment, the inner wall and the outer wall of the filter medium body extend concentrically to each other so that the filter medium body has a constant radial thickness, even though also embodiments are possible however in which the filter medium body has a changing radial thickness along its circumference.

According to a further expedient embodiment, the round filter element has a cross section shape that tapers in axial direction so that the outer circumference of the round filter element in the region of the first end disk is of a different size in comparison to the outer circumference of the round filter element in the region of the oppositely positioned second end disk. In this embodiment, round cross section shapes in the region of both end discs are also conceivable so that the round filter element and the filter medium body are embodied in a conical shape. Moreover, it is possible to provide an oval or ovalized cross section shape, respectively, in the region of both end disks.

In case of a tapering cross section shape of the round filter element, the end disk at the end face with the smaller outer circumference can be embodied to be closed and can close off axially the inwardly positioned flow space, while the oppositely positioned end disk at the larger outer circumference comprises a flow opening for introducing fluid into the inwardly positioned flow space.

Moreover, embodiments are also possible in which the end disk at the end face with the larger outer circumference is embodied to be closed and closes off axially the inwardly positioned flow space, and the oppositely positioned end disk at the smaller outer circumference comprises a flow opening for introducing fluid into the inwardly positioned flow space.

The round filter element according to the invention comprises at the outer wall of the filter medium body a support grid that is in particular embodied to be shape-stable. The support grid is, for example, embodied as a thermoplastic injection-molded part. Due to the flow through the filter medium body in radial direction from the interior to the exterior, the wall of the filter medium body is subjected to a radial outwardly oriented pressure under which the wall has the tendency to curve outwardly. The support grid at the outer wall of the filter medium body prevents a deformation of the wall outwardly in radial direction and thus maintains the shape of the filter medium body during filtration so that a deformation is avoided. Correspondingly, the filter medium body maintains over a long operating period its original geometric shape, and the flow conditions during filtration of the fluid are maintained. Also, the filter medium body experiences at the outer side a support action by the support grid so that the filter medium body is subjected to reduced loads and the risk of damage of the filter medium body is reduced. Advantageously, at least one end face of the support grid, as needed, both end faces, are embedded in the end disks. At least one end disk is comprised preferably of a softer material than the support grid and a seal carrier at the filter element which receives a sealing element. Preferably, the end disk or the end disks are produced of a pourable material such as, as an example and preferred, polyurethane (PUR), in particular polyurethane foam.

The filter medium body is preferably configured as a folded filter with a plurality of filter folds forming pleats. The filter folds extend preferably in or approximately in radial direction and thus in the flow direction and extend at the same time axially between the two end faces of the filter medium body. The folded filter is of an annularly closed configuration.

In particular, precisely one filter medium body embodied as a round filter is arranged in the filter element or encompassed by the filter element.

In a preferred embodiment a first end face of the filter medium body is substantially planar and lying in a first end face plane, and having a positioning element formed as a recess or depression at the first end face which ends axially into the first end face plane.

According to a further advantageous embodiment, a shaped body projects into the positioning element at one end face of the filter medium body and stabilizes additionally the filter medium body and secures the filter folds in the desired position in the embodiment as a folded filter. In the embodiment with a tapering cross section surface, the shaped body is preferably located at the end face with reduced cross section surface. The shaped body can be embodied as one piece together with the support grid at the filter medium body so that supporting forces, acting on the end face of the filter element with the shaped body, are distributed through the shaped body to the support grid and the end disk is relieved from the supporting forces.

The outer contour of the shaped body corresponds advantageously to the outer contour and/or the inner contour of the filter medium body at its end face into which the shaped body is projecting into the filter medium body. It can be expedient to connect the shaped body at least over sections thereof to the neighboring end disk, for example, to form a support sleeve on the shaped body that is projecting into the end disk. The end disk into which one or a plurality of sections of the shaped body are projecting is preferably of a closed configuration and seals flow-tightly the interior inside the filter medium body. As needed, the shaped body can taper within the space surrounded by the filter medium body toward its free end face in particular in a wedge shape whereby the manufacturing process of the filter element is simplified and supported. The shaped body is in particular embodied as an elongate body and extends along the long sides of the filter element between opposite sides of the support grid, in particular the short sides with pronounced curvature. When producing the filter element, the filter medium body is centered and is brought into the shape which the filter medium body is to assume in final position by means of the shaped body when pushing the filter medium body onto the shaped body.

According to an advantageous embodiment, the round filter element comprises a sealing element, in particular a circumferentially extending sealing ring, that is arranged at a seal carrier, embodied in particular separate from the end disk, and arranged adjacent to the end disk, arranged at the raw air side and/or open, through which the unpurified fluid can be introduced into the inwardly positioned flow space. In this context, the sealing element is positioned axially and radially at a spacing relative to the neighboring nearest end disk. In particular viewed in the direction of the longitudinal axis of the filter element, it is arranged between the two end faces of the filter medium body and between the two end disks and spaced apart relative to them. In other words, the sealing element defines a sealing plane which is located between and preferably parallel to the end faces of the filter medium body or the end disks. By means of the sealing element, a flow-tight separation of the raw side from the clean side is realized. Due to the configuration of the sealing carrier separate from the end disk, the end disk is not subjected to the holding and sealing forces which are absorbed by the sealing element and the seal carrier in the installation situation of the round filter element. The end disk therefore remains unaffected by the holding and sealing forces. Due to the spacing of the sealing element and advantageously also of the seal carrier axially and radially relative to the neighboring end disk, seal carrier and sealing element also have a spacing relative to the clean side or outer side of the filter medium body so that the fluid can exit through the clean side of the filter medium, unhindered by the seal carrier and by the sealing element. The seal carrier is fluid-tightly embodied and connects advantageously the nearest end disk fluid-tightly with the sealing element, i.e., the end disk arranged at the raw air side and/or open and neighboring the seal carrier.

The seal carrier is axially spaced apart relative to the end face of the neighboring nearest end disk. Relative to the total axial height of the filter element, the axial spacing amounts to, for example, maximally 30% of the axial height, preferably maximally 20% of the axial height, or maximally 10% of the axial height.

According to a preferred embodiment, the seal carrier is arranged at the support grid. In particular, a one-piece configuration of support grid and seal carrier is conceivable, which are preferably embodied as plastic components. The sealing and holding as well as supporting forces are absorbed correspondingly by the seal carrier and the support grid while the filter medium body is relieved of these forces.

According to a further advantageous embodiment, the seal carrier is embodied as a circumferentially extending carrier wall or comprises a circumferentially extending carrier wall which is extending at a spacing relative to the outwardly positioned wall surface of the filter medium body. The carrier wall extends in particular parallel to the outwardly positioned wall surface of the filter medium body. In this way, the carrier wall can preferably form a tube section surrounding the filter medium body about a portion of its length having the sealing element arranged at its one end or end face and, at its other end or end face, the carrier wall is preferably, and in particular seal-tightly, connected with the neighboring end disk or end disk nearest the sealing element. The sealing element is advantageously inserted into a receiving groove in the carrier wall, wherein the receiving groove is preferably located at or adjacent to an end face of the carrier wall. The position of the sealing element at the carrier wall is located at the end surface or end face of the carrier wall which is facing away from the nearest end disk.

In a preferred embodiment, the seal carrier or the carrier wall, in particular at the end face of the seal carrier or carrier wall facing away from the sealing element, is connected seal-tightly and preferably with form fit to the end disk nearest the sealing element, i.e., the open end disk, in particular is embedded therein or glued thereto. In cases in which seal carrier and support grid are formed as one piece, the unit of seal carrier and support grid can advantageously be connected respectively in such a way to both end disks, preferably respectively by embedding the respective end face ends in the respective end disk, so that the end face ends of seal carrier and support grid are embedded with form fit in the end disks.

The seal carrier is supported advantageously in the installed position at a housing component, for example, at an inwardly positioned shoulder in a filter housing base that receives the filter element and to which a housing cover can be attached.

At the end face, in particular at the top side of the seal carrier, knobs can be integrally formed, as needed, advantageously with axial spacing relative to the end face. These knobs have the function of a tolerance compensation and can compensate deviations of the seal carrier relative to a plane surface for attaching the housing cover and/or placing onto the shoulder in the filter housing base. The knobs are, for example, rod-shaped and are positioned parallel to the sidewall of the seal carrier; the rod-shaped knobs extend, for example, in radial direction. In the installed position, the knobs are pressed into the material of the housing component and/or the knobs are in particular elastically or plastically deformed and compensate thereby tolerance deviations. Preferably, a softer material is selected for the knobs than for the housing component (in particular the housing cover) so that the deformation is substantially or completely realized by the knobs.

According to a further embodiment that relates in particular to a round filter element with a cross section shape that tapers in axial direction, the smaller end disk comprises radially projecting support cams. Advantageously, these support cams project in radial direction no farther than the oppositely positioned end disk or the inner contour or outer contour of the oppositely positioned seal. However, a slight protrusion may be provided in order to achieve a particularly strong clamping action. The inner contour of seal carrier and/or sealing element extend advantageously in radial direction substantially along the outer circumference of the larger end disk.

In case of an oval or ovalized cross section shape of the filter medium body, the support cams are preferably located at the long sides and are in particular arranged at the end disk, preferably at the smaller end disk, in particular embodied as one piece together with the end disk and integrally formed thereat. However, it is also possible to arrange additionally at the narrow side one or several cams at the end disk. The cams project in radial direction past the end disk and support preferably the round filter element in the installed state at the receiving filter housing.

A further aspect of the invention relates to a filter device with an afore described round filter element and with a filter housing for receiving the round filter element.

The filter housing includes in particular also a housing cover which can be attached to a filter housing base in order to close off the receiving space inside the filter housing base in which the filter element is inserted. At the inner side of the housing cover, according to a further advantageous embodiment, a preferably blade-shaped flow guiding rib is arranged which assists in introducing the fluid flow into the inwardly positioned flow space and in uniform particle loading of the filter element during the filtration of the fluid, in particular also in case of non-symmetrical or non-parallel flow conditions. The unpurified fluid is preferably guided from the exterior radially in the direction toward the filter medium body and impinges then on the flow guiding rib at the inner side of the housing cover which influences the impacting fluid flow, for example, divides it into two and/or deflects it in axial direction toward the inwardly positioned flow space inside the filter medium body.

Different embodiments of the flow guiding rib are conceivable. The flow guiding rib is embodied either to be straight and positioned in a plane or, according to an alternative embodiment, curved. In case of a straight configuration, the flow guiding rib can extend in axial direction of the filter element so that the wall faces of the flow guiding rib extend parallel to the longitudinal axis of the filter element.

The flow guiding rib can protrude into the flow opening which is provided in the end disk of the round filter element through which the unpurified fluid is introduced into the inwardly positioned flow space inside the filter medium body.

According to a further expedient embodiment, a lateral inflow opening through which the unpurified fluid flows in radially is provided in the housing cover and is pointing in radial direction. The flow guiding rib can be arranged adjacent to this inflow opening in the housing cover. The flow guiding rib can be positioned in such a way that the end face of the flow guiding rib is facing the inflow opening in the housing cover. The fluid flow which is radially supplied through the housing cover impacts on the flow guiding rib and experiences a deflection in the direction toward the inwardly positioned flow space inside the filter medium body. The flow guiding rib and the inflow opening can be oriented at least approximately parallel.

Advantageously, a lateral inflow opening is also provided in the filter housing base of the filter housing for the fluid to be supplied wherein this inflow opening in the filter housing base and the lateral inflow opening in the housing cover in the mounted state lie on top of each other and form a continuous flow path for the supplied fluid.

According to a further expedient embodiment, a lateral outflow opening is provided in the filter housing base, which is oriented preferably in radial direction and through which the purified fluid flows out. It can be expedient that the outflow opening is oriented at least approximately parallel to the inflow opening as well as to the flow guiding rib.

According to a further expedient embodiment, the filter element in the installed state is projecting axially slightly past the end face of the filter housing base whereby the removal of the filter element from the filter housing base, for example, for servicing purposes, is facilitated. The seal carrier with the sealing element is positioned at a small axial spacing relative to the projecting end face of the filter element and provides for a flow-tight separation between the outwardly positioned section of the filter element and the inwardly positioned section of the filter element received in the filter housing base.

At or adjacent to an end face, a circumferentially extending seal carrier is arranged at the round filter element where, in the installed state inside the filter housing, a sealing element is supported which is positioned adjacent to the radial outer side of the filter medium body. The sealing element is advantageously arranged at the seal carrier of the round filter element, in particular inserted in a receiving groove in the sealing carrier wherein also embodiments are conceivable in which the sealing element is located in the filter housing and the sealing element is resting against the seal carrier of the round filter element only in the installed state. In the installed state, the sealing element separates the raw side from the clean side of the filter element.

At the filter element a positioning element is arranged with which a form-fit connection of the round filter element with a correlated housing-associated counter positioning element can be produced in the installed state. Advantageously, the seal carrier is also carrier of the positioning element. The form-fit connection between positioning element at the round filter element and counter positioning element at the filter housing relates to at least one relative movement possibility of the round filter element relative to the filter housing and serves, for example, as an anti-rotation device of the round filter element in the filter housing or as a positioning aid for the filter element and/or a housing part when exchanging the round filter element in the housing in a service situation. By means of the positioning element and the correlated housing-associated counter positioning element, the position of the round filter element in the filter housing is unequivocally determined whereby the insertion of the filter element into the filter housing is simplified. This is achieved in a constructively simple embodiment in that the positioning element is arranged at the filter element, in particular in that the seal carrier, in addition to absorbing the sealing forces which are caused by the sealing element, is also carrier of the positioning element.

The seal carrier flow-tightly separates the raw side and the clean side from each other at the filter element so that a flow bypass of the fluid to be purified by bypassing the filter medium body is precluded.

The seal carrier is advantageously of an annular configuration and is positioned in a plane that is oriented orthogonally to the longitudinal axis of the filter element. Sealing element and positioning element can be positioned, for example, at oppositely positioned axial side faces of the seal carrier.

The circumferentially extending seal carrier also provides for higher stability of the round filter element, in particular in radial direction. The outer rim of the seal carrier can optionally be supported at the inner wall of the receiving filter housing.

In case of an annular embodiment of the seal carrier, the latter is advantageously positioned at the in particular radial outer side of the filter medium body. The sealing element is also located at the radial outer side of the filter medium body. The filter medium body is advantageously flowed through radially from the interior to the exterior or from the exterior to the interior by the fluid to be purified so that the seal carrier and the sealing element are located at the clean side of the filter medium body.

According to an advantageous embodiment, the positioning element is formed as one piece together with the seal carrier. The seal carrier is preferably embodied as a plastic component that is producible in particular by an injection molding process. As needed, also a two-part configuration of positioning element and seal carrier is conceivable wherein, in this case, the positioning element is advantageously fixedly connected to the seal carrier or to a support grid at the filter medium body.

According to a further advantageous embodiment, the positioning element extends optionally into the filter medium body, in particular radially into the filter medium body. Advantageously, the annular seal carrier surrounds the filter medium body and the positioning element is located at the radial inwardly positioned side of the seal carrier and is positioned thus at least with sections thereof within the filter medium body. This embodiment has the advantage that an additional, radially outwardly projecting space is not required for the arrangement of the positioning element. Accordingly, the maximum radial extension of the filter element is determined by the outwardly positioned rim area of the seal carrier.

According to a further expedient embodiment, the positioning element is in particular embodied as a wedge-shaped hollow body into which the housing-associated counter positioning element projects in the mounted state. The hollow body receives the, for example, blade-shaped counter positioning element so that a form-fit connection between positioning element and counter positioning element is achieved, wherein the form fit is effective as needed in all radial directions. In case of correctly installed position of the filter element inside the filter housing, advantageously no or only a slight contact without force transmission exists between positioning element and counter positioning element.

In an alternative embodiment, the counter positioning element is embodied as a hollow body into which the positioning element projects.

According to a further advantageous embodiment, relating to the positioning element as a hollow body, a bottom in the form of a bottom plate is provided in the hollow space within the positioning element for flow-tight sealing of the hollow space. In this way, it is ensured that an undesired bypass between raw side and clean side through the positioning element embodied as a hollow body is prevented. As an alternative to a bottom, also a conical tapering of the walls of the hollow body is conceivable that meet at the pointed side of the hollow body and close it off flow-tightly in axial direction.

According to a further expedient embodiment, the bottom in the hollow space of the positioning element is located axially at the level of the seal carrier. The seal carrier is thus extended radially into the positioning element in order to from the bottom in the hollow space of the positioning element which, at the same time, represents an axial boundary for the counter positioning element which is axially inserted into the hollow space.

According to a further expedient embodiment, the positioning element is embodied as an elongate body, for example, as a wedge, whose longitudinal axis extends in radial direction, and is arranged in particular at the radial inner side of the seal carrier. The elongate body extends into the filter medium body which is advantageously embodied as a folded filter whose filter folds extend approximately in radial direction. The elongate body projects into a filter fold whose fold walls are contacting the outer side of the elongate body; the filter fold is expanded by the elongate body. In case of an arrangement of the seal carrier surrounding the filter medium body, the positioning element which is embodied as an elongate body extends from the radial outer side of the filter medium body in radial direction inwardly.

The extension of the elongate body in radial direction for a non-round cross section shape of the filter element amounts to, as an example, 5% to 50% of the total length, measured transverse to the longitudinal axis of the filter element, and, for example, 10% to 30% of the total width, also measured transverse to the longitudinal axis as well as viewed orthogonally to the total length. In an embodiment of the filter medium body as a folded filter, the radial extension of the elongate body advantageously amounts to 30% to 90% of the radial length of the filter folds. The width of the positioning element, in relation orthogonal to its length extension, is 2 mm to 15 mm, for example.

According to a further advantageous embodiment, at a wall side of the filter medium body, preferably at the outer side of the filter medium body, a support grid is arranged wherein the seal carrier is supported by the support grid. According to an expedient embodiment, seal carrier and support grid are of a one-piece configuration. In case of flow through the filter medium body in radial direction from the interior to the exterior, the support grid as well as the annularly surrounding seal carrier contact the radial outer side of the filter medium body.

According to a further advantageous embodiment, the seal carrier is arranged with axial spacing relative to the nearest end face of the round filter element. Also, the positioning element can have an axial spacing relative to the next end face. The axial spacing between the seal carrier and the nearest end face of the round filter element amounts to, for example, between 10% and 30% of the axial total height of the round filter element. This spacing can be, for example, 30 mm to 80 mm.

According to yet another advantageous embodiment, an end disk for flow-tight sealing of the filter medium body is provided at the nearest end face. Preferably, a cutout is provided in the end disk which is axially aligned with the positioning element which has an axial spacing relative to the end disk. In the mounted state, a housing-associated counter positioning element is projecting through the cutout. In this way, the positioning element is preferably embodied as a bulge that is in particular radially projecting into the filter medium body. The bulge and/or the positioning element is preferably open radially in outward direction and axially in the region of the nearest end disk or the end disk nearest the sealing element. The bulge and/or the positioning element moreover comprises a closed bottom in a region which is axially spaced apart from the end disk, in particular, as described before, preferably at the level of the sealing element. The bulge and/or the positioning element moreover comprises two sidewalls that are seal-tightly connected with each other at the ends projecting into the filter medium body and that, in turn, can be seal-tightly connected to the end disk. The positioning element is thus preferably closed and connected fluid-tightly with the end disk and the sealing element in such a way that the raw side is separated from the clean side. In other words, it is preferred that the carrier wall, embodied as tube section surrounding the filter medium body across a portion of its length, for forming the positioning element has an in particular radial, in particular wedge-shaped recess wherein the recess, in the region of the seal-associated end of the carrier wall, is fluid-tightly closed and is embodied to be open at the oppositely positioned side.

According to yet another expedient embodiment, at least two positioning elements are distributed about the circumference at the seal carrier. The positioning elements are located, for example, at diametrically opposed sides at the round filter element, for example, in case of a non-round cross section shape of the round filter element at the oppositely positioned narrow sides or at the rounded side.

The invention concerns also a filter device with an afore described round filter element and with a filter housing for receiving the round filter element. The filter housing comprises expediently also a housing cover at whose inner side the counter positioning element can be arranged. The counter positioning element is embodied, for example, as a blade that, in the mounted state, projects into the hollow space in the positioning element which is configured as an elongate body.

The seal carrier is located at or adjacent to an end face of the filter element wherein the outer rim of the seal carrier advantageously projects radially past the outer side of the filter medium body and advantageously also past the outer side of a possibly existing support grid so that the outer rim serves for lateral support of the filter element in the filter housing in the installed state. At or adjacent to the oppositely positioned end face, the filter element can have one or a plurality of laterally radially projecting cams for support at this end face of the filter element in the filter housing. In axial direction, the filter element can have a tapering cross section shape wherein the filter element has the larger cross section shape adjacent to the seal carrier.

BRIEF DESCRIPTION OF THE DRAWINGS

Further advantages and expedient embodiments can be taken from the further claims, the figure description, and the drawings.

In the Figures, same components are provided with same reference characters.

DESCRIPTION OF PREFERRED EMBODIMENTS

Figure 1:
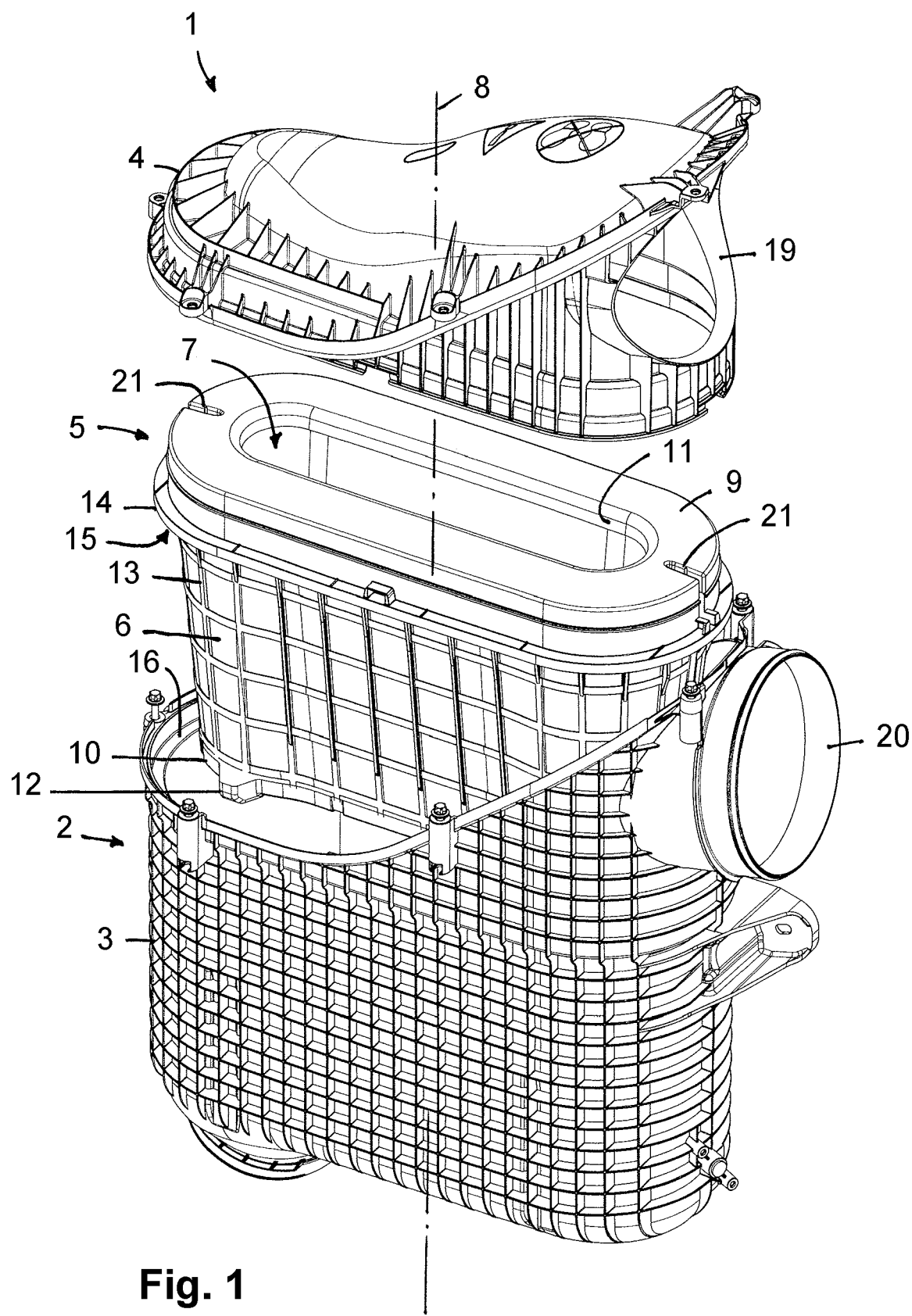
FIG. 1 shows in exploded illustration a filter device for gas filtration, with a filter housing, a filter element, and a housing cover.

In FIG. 1, a filter device 1 is illustrated that is used preferably for gas filtration, in particular for air filtration in the intake manifold of an internal combustion engine. The filter device 1 comprises a filter housing 2, which is comprised of a filter housing base 3 and a housing cover 4, and a filter element 5 that is insertable into the filter housing base 3. The housing cover 4 closes off the receiving space inside the filter housing base for receiving the filter element 5.

The filter element 5 comprises a filter medium body 6 where the filtration of the fluid to be purified is taking place. The filter element 5 is configured as a round filter element; correspondingly, the filter medium body 6 is also embodied as a round element that surrounds an inwardly positioned flow space 7 into which the fluid to be purified is introduced. The fluid is introduced axially, relative to the longitudinal axis 8 of the filter element 5 and of the filter device 1, into the flow space 7. Subsequently, the fluid flows through the wall of the filter medium body 6 in radial direction from the interior to the exterior. Accordingly, the inner wall of the filter medium body 6 is the raw side and the outer wall is the clean side.

The filter element 5 and the filter medium body 6 comprise a strongly ovalized shape with two parallel extending long sides and semicircular narrow sides. Also, the filter element 5 has a conical basic shape where the axially oppositely positioned end faces of the filter element 5 are of a different size and have an outer circumference of a different size. The axial end faces of the filter medium body 6 are covered by a respective end disk 9, 10 in a fluid-tight way, wherein the end disk 9 at the larger end face of the filter element 5 is embodied to be open and comprises a flow opening 11 through which the raw fluid can flow into the inwardly positioned flow space 7. The oppositely positioned end disk 10, on the other hand, is embodied to be closed so that the inwardly positioned flow space 7 is also axially closed at this side.

At the closed end disk 10, cams 12 are integrally formed which extend radially in outward direction and are positioned at the long sides adjacent to the narrow sides. The cams 12 which are formed as one piece together with the end disk 10 support the filter element 5 at the filter housing base 3 in the mounted state. In radial direction, the cams 12 preferably do not project farther than the oppositely positioned larger end disk 9.

At the outer wall of the filter medium body 6, there is a support grid 13 which is in particular made of plastic material and is embodied separate from the end disks 9 and 10. The support grid 13 supports the filter medium body at its outer wall in radial direction. Due to the radial flow through the filter medium body 6 from the interior to the exterior, a pressure oriented outwardly is produced in the filter medium body which is absorbed by the support grid 13. This ensures that the filter medium body 6 is not deformed by the pressure of the fluid flowing through it.

Adjacent to the end disk 9 provided with the flow opening 11 for introducing the raw fluid, there is a seal carrier 14 that carries a sealing element 15. The seal carrier is embodied as an annular circumferentially extending carrier wall that preferably is embodied as one piece together with the support grid 13. The sealing element 15 is designed as a sealing ring that is preferably inserted into a receiving groove in the end face of the carrier wall 14 at the side that is facing away from the neighboring end disk 9. The sealing element 15 is facing away from the end disk 9 and is facing the oppositely positioned end disk 10 and, in the mounted state, is resting against a circumferential shoulder 16 at the inner wall of the receiving filter housing base 3.

In the housing cover 4, a lateral flow opening 19 is provided through which the raw fluid can flow radially into the filter device. The flow opening 19 in the housing cover 4 corresponds with a further flow opening 20 provided in the filter housing base 3. When the housing cover 4 is attached, the flow openings 19 and 20 are lying on top of each other so that a continuous flow path for the raw fluid is formed.

Figure 2:
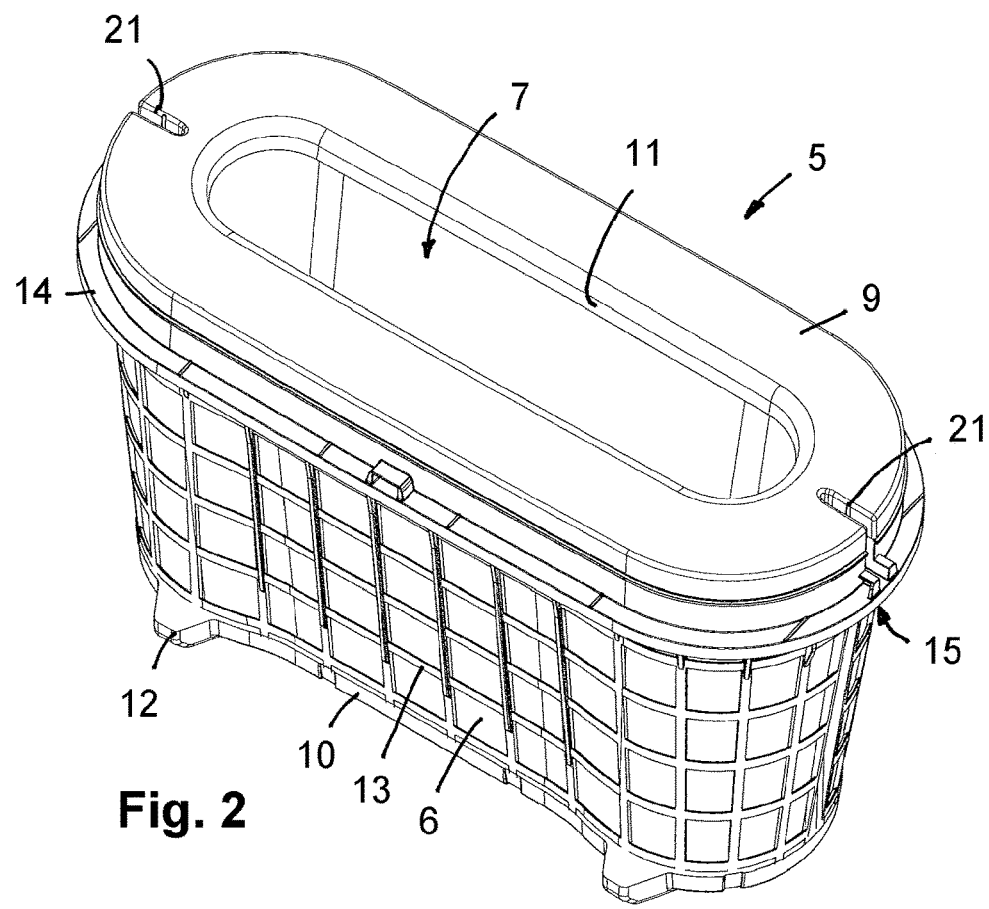
FIG. 2 shows in perspective view the filter element.
Figure 3:
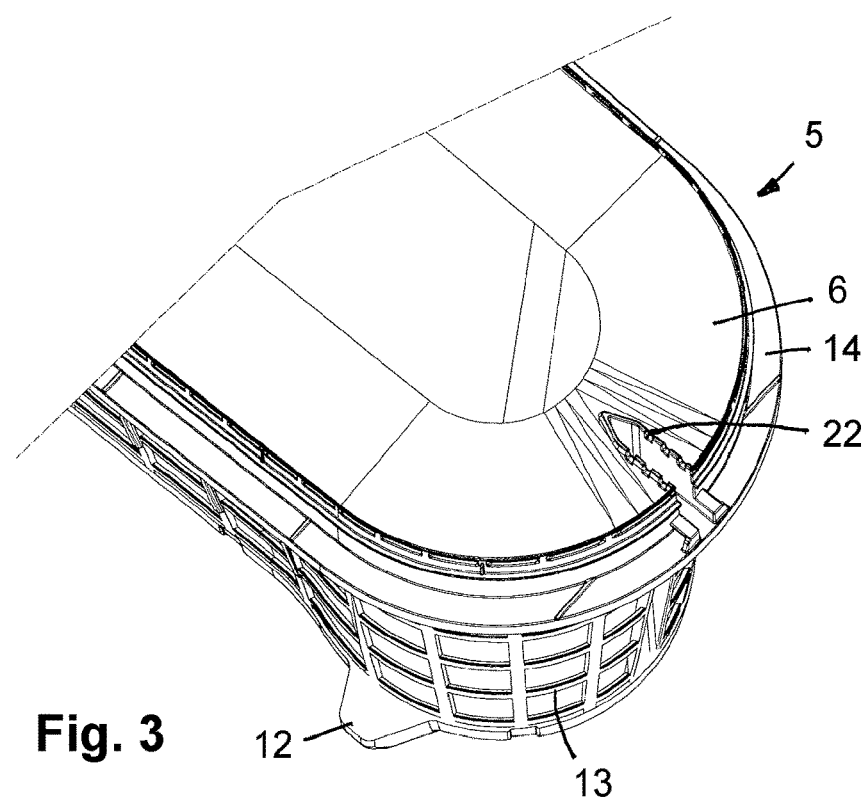
FIG. 3 shows the filter element, however without end face end disk, with a wedge-shaped positioning element that is projecting radially into the filter medium body embodied as a folded filter.

As can be seen in FIG. 1 in connection with FIG. 2, the top end disk 9, which is arranged adjacent to the annular circumferentially extending seal carrier 14, is provided in the region of the two oppositely positioned semicircular narrow sides with a respective recess, depression or cutout 21, making it possible to axially insert a counter positioning element 23 (FIGS. 5, 6), provided at the inner side of the housing cover 4, into a correlated positioning element 22 (FIGS. 3, 4) in axial direction, wherein the positioning element 22 is a component of the filter element 5. The positioning element 22 is configured as a wedge-shaped elongate body which is extending from the circumferentially extending seal carrier 14 radially in inward direction. The seal carrier 14 is resting against the radial outer side of the filter medium body 6, the wedge-shape positioning element 22 projects, as can be seen in FIG. 3, radially into the filter medium body 6 which is designed as a folded filter with a plurality of filter folds.

The wedge-shaped positioning element 22 is configured as a hollow body while the counter positioning element 23 provided at the inner side of the housing cover 4 is embodied as a blade. In the mounted state, the blade 23 projects into the hollow body 22 so that centering of the filter element 5 in the filter housing 2 is achieved. Due to the symmetrical configuration of the filter element 5 with cutouts 21 as well as a respective positioning element 22 in the region of diametrically oppositely positioned semicircular narrow sides, the filter element 5 can be inserted into the filter housing 2 in two different positions displaced by 180°. In the embodiment, there is only one blade-shaped counter positioning element 23 at the inner side of the housing cover 4. In principle, it is also possible to provide two such counter positioning elements 23 at the inner side of the housing cover 4 which each are projecting through a cutout 21 into a correlated positioning element 22 in the filter element 5.

The circumferentially extending sealing element 15 is supported at the inwardly projecting shoulder 16 in the filter housing base 3 and provides for a flow-tight separation of the raw side from the clean side. In order to prevent an undesirable bypass between raw side and clean side through the positioning element 22 embodied as a hollow body, the positioning element 22 comprises a bottom 24 in the form of a bottom plate (FIG. 4) which is formed as one piece together with the seal carrier 14 and extends at the level of the plane of the seal carrier 14 radially inwardly into the inwardly positioned hollow space of the positioning element 22. The bottom 24 closes off the inwardly positioned hollow space in the positioning element 22 so that no undesirable flow of the fluid between raw side and clean side can be generated through the positioning element 22.

Figure 4:
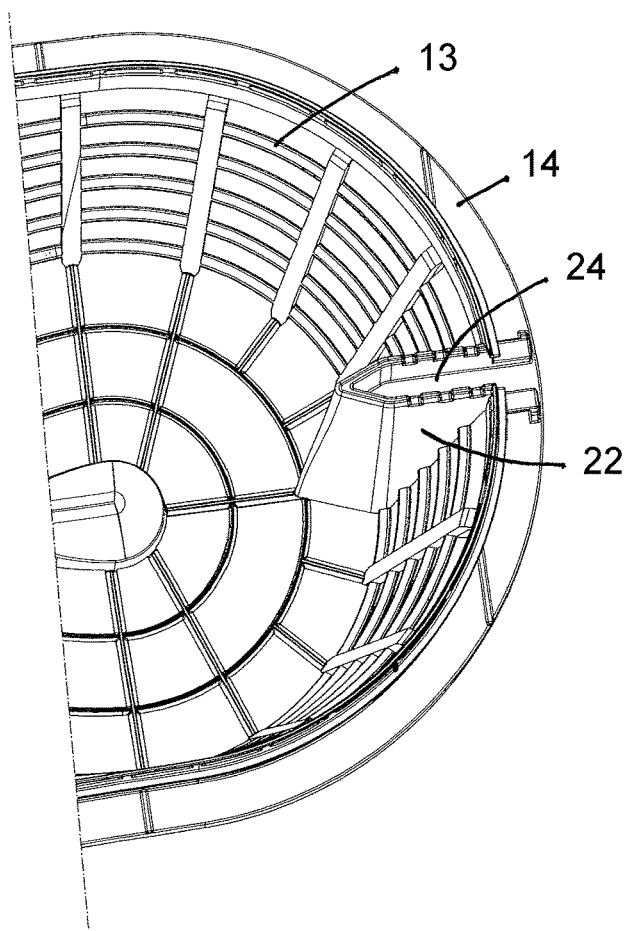
FIG. 4 shows a circumferentially extending seal carrier of the filter element with the radially oriented positioning element and a support grid.
Figure 5:
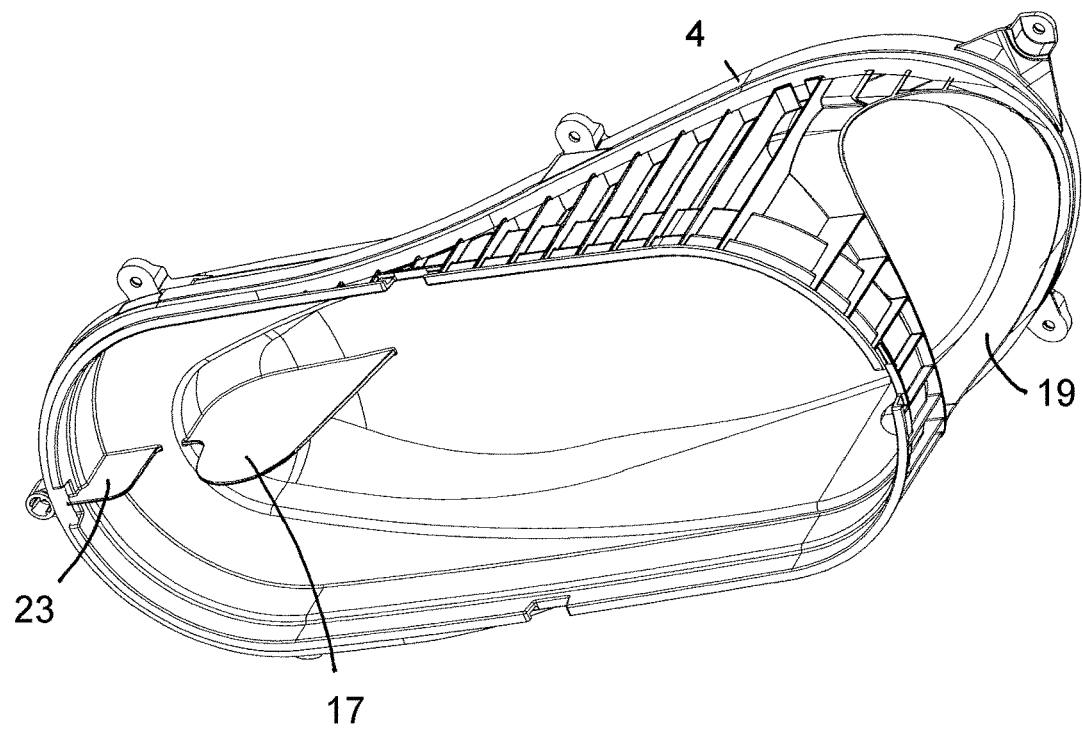
FIG. 5 shows in perspective illustration a housing cover of the filter housing with a counter positioning element at the inner side.

As can be seen furthermore in FIG. 4, the positioning element 22 extends at the inner side of the support grid 13 axially across the entire height of the support grid. However, it can be expedient to embody the positioning element 22 to be axially shorter wherein basically an axial height between the bottom 24 and the top end face of the positioning element 22 is sufficient.

The seal carrier 14 is spaced apart axially from the top end face of the end disk 9. Between the top edge of the positioning element 22 and the top end face of the end disk 9, there is an axial spacing so that the end disk 9, as can be seen in FIGS. 1 and 2, covers the positioning element 22 completely. Only via the cutouts 21 provided in the end disk 9 there is an access to the positioning element 22 by means of which, upon attachment of the cover 4, the blade-shaped counter positioning element 23 can be inserted into the positioning element 22.

Figure 6:
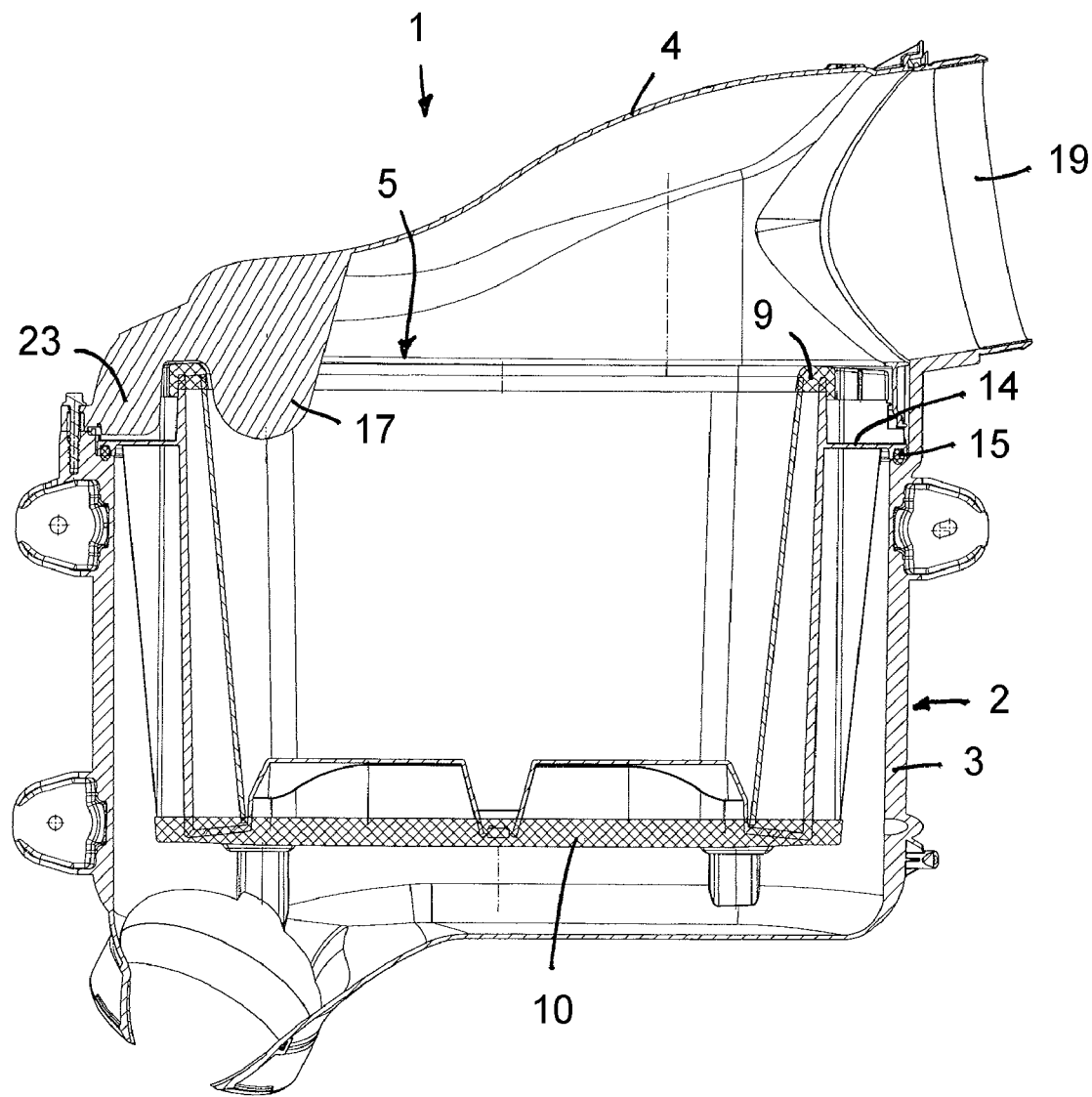
FIG. 6 shows a section through the filter device in mounted state.

At the inner side of the housing cover 4, there is in addition to the blade-shaped counter positioning element 23 also a flow guiding element 17 that is aligned with the counter positioning element 23. The counter positioning element 23 as well as the flow guiding element 17 are embodied to be straight and positioned in a plane. The flow guiding element 17 has a flow-guiding function for the supplied raw air. Between the counter positioning element 23 and the flow guiding element 17, there is a gap provided at the inner side of the housing cover 4 with which the housing cover 4 in the attached state bridges a section of the upper end disk 9 (FIG. 6).

What is claimed is:

1. A round filter element comprising:
    a filter medium body of a filter medium, the filter medium body having a longitudinal axis and comprising:
        a first end face and
        a second end face,
        wherein the filter medium body surrounds the longitudinal axis, the longitudinal axis extending through the first end face and the second end face;
        wherein axial, as used herein, is a direction parallel to the longitudinal axis,
        wherein radial, as used herein, is a direction transverse the the longitudinal axis;
    a circumferentially extending seal carrier arranged at or adjacent to the first end face of the filter medium body;
    a sealing element supported at the seal carrier adjacent to a radial outer side of the filter medium body;
    wherein the first end face of the filter medium body is substantially planar and lying in a first end face plane, and having a positioning element formed as a recess or depression at the first end face which ends axially into the first end face plane;
    wherein the positioning element is configured to engage with form fit a correlated housing-associated counter positioning element of a filter housing when the round filter element is installed in the filter housing;
    wherein the seal carrier and the sealing element separate flow-tightly a raw side of the round filter element from a clean side of the round filter element when the round filter element is installed in the filter housing;
    wherein the positioning element, beginning at the radial outer side of the filter medium body, extends inwardly in the radial direction into the filter medium body,
    wherein the positioning element defines a recess, depression or a hollow space;
    wherein the positioning element is configured and adapted to engage with a correlate housing-associated counter positioning element of a filter housing when the round filter element is installed in the filter housing, the housing-associated counter positioning element positioned at an inner side of the housing cover, the hollow space of the positioning element being configured and adapted to receive the blade-shaped housing-associated counter positioning element projecting into the positioning element of the round filter element.

2. The round filter element according to claim 1, wherein the positioning element is disposed at the seal carrier.

3. The round filter element according to claim 1, wherein the positioning element is a hollow body comprising a hollow space.

4. The round filter element according to claim 3, wherein a bottom is provided in the hollow space of the hollow body and is configured to flow-tightly seal the hollow space relative to the filter medium of the filter medium body.

5. The round filter element according to claim 4, wherein the bottom is positioned axially at a level where the seal carrier is axially arranged relative to the longitudinal axis of the filter medium body.

6. The round filter element according to claim 1, wherein the positioning element is an elongate body which is elongated along an axis of elongation extending in the radial direction.

7. The round filter element according to claim 1, wherein the elongate body has a portion forming a wedge.

8. The round filter element according to claim 1, further comprising
    a support grid disposed on a radially outer circumferential wall of the filter medium body,
    wherein the seal carrier is connected to and supported by the support grid.

9. The round filter element according to claim 8, wherein the support grid and the seal carrier are embodied as a unitary, one piece component.

10. The round filter element according to claim 1, wherein the filter medium of the filter medium body is folded into a plurality of folds forming pleats.

11. A filter device comprising:
    a round filter element according to claim 1;
    a filter housing into which the round filter element is received, the filter housing comprising
    a counter positioning element,
    wherein the positioning element of the round filter element is configured to engage with the counter positioning element of the filter housing when the round filter element is installed in the filter housing,
    wherein the seal carrier and the sealing element separate flow-tightly a raw side of the round filter element from a clean side of the round filter element when the round filter element is installed in the filter housing.

12. The filter device according to claim 11, wherein the filter housing comprises
    a housing cover,
    wherein the counter positioning element is provided on the housing cover at an inner side of the housing cover.

13. The filter device according to claim 11, wherein the counter positioning element is a blade.

* * * * *